(12) United States Patent
Weigl

(10) Patent No.: US 6,684,708 B2
(45) Date of Patent: Feb. 3, 2004

(54) PRESSURE SENSOR FOR DETECTING THE PRESSURE OF A LIQUID

(75) Inventor: Manfred Weigl, Viehhausen (DE)

(73) Assignee: Siemens AG, Munich (DE)

( * ) Notice: Subject to any disclaimer, the term of this patent is extended or adjusted under 35 U.S.C. 154(b) by 0 days.

(21) Appl. No.: 10/182,756

(22) PCT Filed: Jan. 31, 2001

(86) PCT No.: PCT/DE01/00376
§ 371 (c)(1),
(2), (4) Date: Dec. 9, 2002

(87) PCT Pub. No.: WO01/57488
PCT Pub. Date: Aug. 9, 2001

(65) Prior Publication Data
US 2003/0140703 A1 Jul. 31, 2003

(30) Foreign Application Priority Data
Feb. 3, 2000 (DE) ......................... 100 04 614

(51) Int. Cl.⁷ ............................... G01L 7/00
(52) U.S. Cl. .......................... 73/700; 73/715
(58) Field of Search ............... 73/700, 714, 715

(56) References Cited
U.S. PATENT DOCUMENTS 4,916,426 A * 4/1990 Yajima et al. ............ 338/4
5,792,958 A 8/1998 Speldrich
6,536,286 B1 * 3/2003 Moyer et al. ............. 73/716

FOREIGN PATENT DOCUMENTS

| DE | 2040786 | 2/1971 |
|----|---------|--------|
| DE | 4205264 | 8/1993 |
| DE | 4407212 | 8/1995 |
| DE | 19743337 | 1/1999 |
| EP | 0303979 | 2/1989 |

* cited by examiner

Primary Examiner—Edward Lefkowitz
Assistant Examiner—Andre Allen
(74) Attorney, Agent, or Firm—Harness, Dickey & Pierce, P.L.C.

(57) ABSTRACT

A pressure sensor includes a pressure sensor element that is provided with a pressure sensor membrane. The pressure sensor element is held in a receiving part in a defined position during operation within a permissible operating pressure range by a spring element. When the permissible range is exceeded, a relative movement, acting against the spring force, between the pressure sensor element and the receiving part takes place, thereby increasing the volume of the space immediately upstream of the pressure sensor membrane. The design allows for a limitation of the pressure and for an effective protection of the pressure sensor membrane when the liquid is frozen.

7 Claims, 3 Drawing Sheets

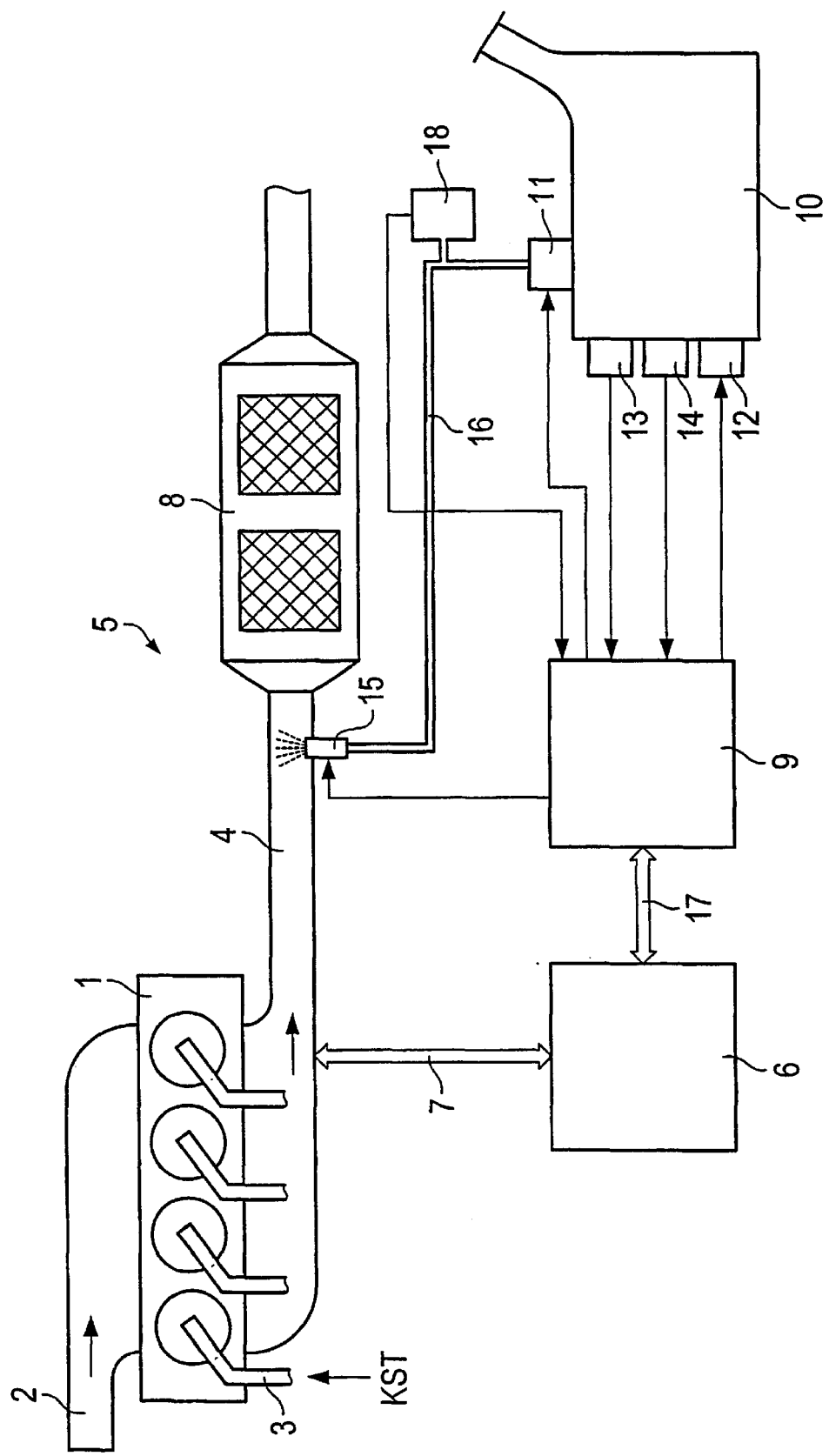

PRESSURE SENSOR FOR DETECTING THE PRESSURE OF A LIQUID

This application is the national phase under 35 U.S.C. §371 of PCT International Application No. PCT/DE01/00376 which has an International filing date of Jan. 31, 2001, which designated the United States of America and which claims priority on German Patent Application No. 100 04 614.2 filed Feb. 3, 2000, the entire contents of which are hereby incorporated by reference.

FIELD OF THE INVENTION

The invention generally relates to a pressure sensor for sensing the pressure of a fluid, in particular, a solution of reducing agent for exhaust gas post-treatment in an internal combustion engine.

BACKGROUND OF THE INVENTION

The nitrogen oxide emissions of an internal combustion engine which operates with an excess of air, in particular a diesel internal combustion engine, can be reduced using the SCR (Selective Catalytic Reduction) method to form atmospheric nitrogen ($N_2$) and the water vapor ($H_2O$). Gaseous ammonia ($NH_3$), ammonia in aqueous solution or urea in aqueous solution is used as the reducing agent. The urea serves here as an ammonia carrier, and using a metering system upstream of a hydraulic catalytic converter it is injected into the exhaust system, converted there into ammonia by way of hydrolysis, and then the nitrogen oxides are in turn reduced in the actual SCR or DENOX catalytic converter.

Such a metering system has, as essential components, a reducing agent container, a pump, a pressure regulator, a pressure sensor, a metering valve and the necessary connecting hoses. The pump feeds the reducing agent stored in the reducing agent container to the metering valve by way of which the reducing agent is injected into the exhaust gas stream upstream of the hydrolysis catalytic converter. The metering valve is actuated by way of signals of a control device in such a way that a specific quantity of reducing agent which is necessary at a given time is fed to the internal combustion engine as a function of operating parameters (DE 197 43 337 C1).

An advantage of the substances, for example urea, which are present in aqueous solutions and which release ammonia is that the storage, handling, feeding and metering can be dealt with relatively easily in technical terms. A disadvantage of these aqueous solutions is that there is a risk of freezing at specific temperatures as a function of the concentration of the dissolved substance.

32% urea solution, such as is typically used in SCR systems as the reducing agent, has a freezing point of −11° C. Here, the volume increases by approximately 10% similarly to the case of water. This increase in volume is compensated mainly by the elastic reducing agent hose, i.e. the rise in pressure is limited by the elasticity of the system. All the components of the system which contain reducing agent must be constructed in such a way that a reduction in pressure in the direction of the hose is possible up to complete freezing. This requires a high degree of resistance to pressure and small dead volumes of the components. In the case of the pressure sensor, the resistance to pressure is limited principally by the pressure sensor diaphragm. The further the burst pressure of the pressure sensor diaphragm lies above the upper measuring limit of the pressure sensor, the lower the sensitivity of the sensor, and thus the measured value resolution and precision. Resistance to frost is therefore most difficult to achieve with the pressure sensor due to the principle.

The increase in volume of water or as here of the aqueous solution of reducing agent at the face transition from fluid to solid is unavoidable. It is not always possible to avoid an uncontrolled rise in pressure in specific system sections here even when using overpressure valves or elastic hose connections, as the freezing largely prevents a hydrostatic pressure equalization.

SUMMARY OF THE INVENTION

An embodiment of the invention includes configuring a pressure sensor in such a way that when a fluid freezes, damage to the pressure sensor, in particular to the pressure sensor diaphragm, can be avoided.

The idea on which an embodiment of the invention is based is to make the unavoidable dead volume directly upstream of the pressure sensor element as small as possible and moreover ensure that this dead volume increases elastically in a defined way, and thus limits the pressure on the pressure sensor diaphragm, when an overpressure occurs owing to the phase transition of the fluid.

For this purpose, the pressure sensor element having a pressure sensor diaphragm may be held in a defined position in such a way by way of a spring element while it is operating within an acceptable working pressure range, and a relative movement, acting counter to the spring force, takes place between the pressure sensor element and holding part when the acceptable working pressure range is exceeded. As a result, a volume increase in the space lying directly upstream of the pressure sensor diaphragm is brought about, causing the pressure to be limited. The pressure sensor diaphragm is thus protected against destruction even when the solution of reducing agent freezes, and thus concomitantly by the volume increase in the frozen solution of reducing agent.

BRIEF DESCRIPTION OF THE DRAWINGS

Further advantageous requirements of the invention are explained in more detail below with reference to the drawings, in which:

FIG. 1 shows a block diagram of an internal combustion engine with associated exhaust gas post-treatment system in which the pressure sensor according to the invention is used.

DETAILED DESCRIPTION OF THE PREFERRED EMBODIMENTS

Figure 2A:
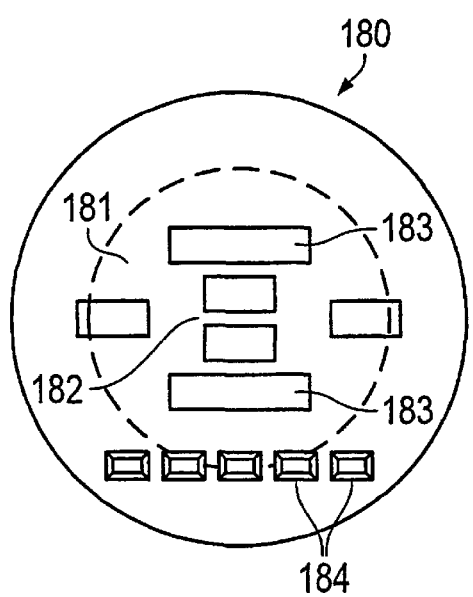
FIG. 2 shows a schematic view of a pressure sensor diaphragm.

FIG. 1 is a very simplified block circuit diagram of an internal combustion engine which is operated with an excess of air and has an exhaust gas post-treatment system assigned to it. Here, only those parts which are necessary for comprehension of the invention are illustrated. In particular, the fuel circuit has not been represented. In this exemplary embodiment, a diesel internal combustion engine is shown as the internal combustion engine and an aqueous solution of urea is used as the reducing agent for post-treatment of the exhaust gas.

The internal combustion engine 1 is supplied with the air necessary for combustion via an intake line 2. An injection system which can be embodied, for example, as a high-pressure storage injection system (common rail) with injection valves which inject fuel KST directly into the cylinders of the internal combustion engine 1 is designated by reference symbol 3. The exhaust gas of the internal combustion engine 1 flows via an exhaust gas line 4 to an exhaust gas post-treatment system 5 and from there into the open air via a sound damper (not illustrated).

In order to control and regulate the internal combustion engine 1, an engine control unit 6 (known per se) is connected to the internal combustion engine 1 via data and control line 7 (illustrated here only schematically. Signals from sensors (for example temperature sensors for intake air, charge air, coolant, load sensor, speed sensor) and signals for actuators, for example injection valves, final controlling elements) are transmitted between the internal combustion engine 1 and the engine control unit 6 via this data and control line 7.

The exhaust gas post-treatment system 5 has a reduction catalytic converter 8 which contains a plurality of catalytic converter units which are connected in series and are not designated in more detail. Downstream and/or upstream of the reduction catalytic converter 8 it is additionally possible to arrange in each case an oxidation catalytic converter (not illustrated). In addition, a metering control unit 9 is provided which is assigned to a reducing agent reservoir container 10 with an electrically actuable reducing agent pump 11 for feeding the reducing agent.

In this exemplary embodiment, aqueous urea solution is used as a reducing agent and is stored in the reducing agent reservoir container 10. The latter has an electrical heating device 12 and sensors 13, 14 which sense the temperature of the urea solution or the filling level in the reducing agent reservoir container 10. In addition, the signals of a temperature sensor which is arranged upstream of the reduction catalytic converter 8, and of an exhaust gas measuring sensor, for example a NOx sensor (not illustrated), which is arranged downstream of the reduction catalytic converter 8 are sent to the metering control unit 9.

The metering control unit 9 controls an electromagnetic metering valve 15 to which urea solution is supplied according to need via a feed line 16 from the reducing agent reservoir container 10 using the reducing agent pump 11. A pressure sensor 18 which senses the pressure in the metering system and outputs a corresponding signal to the metering control unit 9 is inserted into the feed line 16. The urea solution is injected into the exhaust gas line 4 upstream of the reduction catalytic converter 8 by way of the metering valve 15. While the internal combustion engine 1 is operating, the exhaust gas flows through the exhaust gas line 4 in the direction of the arrow indicated.

The metering control unit 9 is connected to the engine control unit 6 via an electrical bus system 17 for the mutual transfer of data. The operating parameters, for example engine speed, air mass flow rate, fuel mass flow rate, regulating travel of an injection pump, exhaust gas mass flow rate, operating temperature, charge air temperature, start of injection etc. which are relevant for calculating the quantity of urea solution to be metered or fed to the metering control unit 9 via the bus system 17.

On the basis of these parameters and the measured values for the exhaust gas temperature and the NOx content, the metering control unit 9 calculates the quantity of urea solution to be injected and outputs a corresponding electrical signal to the metering valve 15 via an electrical connecting line (not designated in more detail). The urea is hydrolyzed and mixed by the injection into the exhaust gas line 4. The catalytic reduction of the NOx in the exhaust gas to N2 and H2O takes place in the catalytic converter units.

The metering valve 15 for introducing the urea solution into the exhaust gas line 4 corresponds largely to a customary low-pressure petrol injection valve which is detachably attached, for example, to a valve holding device which is permanently connected to a wall of the exhaust gas line 4.

Figure 2B:
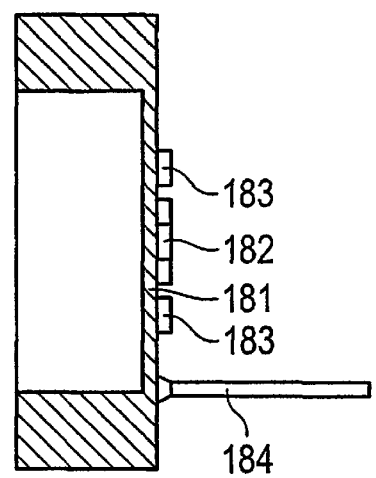

FIG. 2A illustrates a typical ceramic pressure sensor diaphragm 181 with a circular cross section of the pressure sensor 18 from the side facing away from the pressurized medium (reducing agent). FIG. 2B shows this ceramic pressure sensor diaphragm 181 in section. Owing to the chemical resistance properties, sensor elements made of Al2O3 ceramic are particularly suitable for pressure measurements in aqueous urea solution. These sensor elements are composed of a pot-shaped ceramic part with integrated sensor diaphragm 181. A resistor network 182 made of thick-film technology is applied to the sensor diaphragm 181, said resistor network 182 containing the sensor resistors and standardization resistors. The measuring principle is based on the effect of a change in resistance with mechanical stressing of the sensor diaphragm (piezoresistivity). Additional temperature-dependent resistors may be provided to compensate temperature-dependent resistors.

In order to heat the pressure sensor diaphragm 181, additional electrical resistors 183 are applied with the same technology. Sufficient free spaces are available on the pressure sensor diaphragm 181 to apply these electrical heating resistors 183 with a suitable geometry and power. In applications requiring little heating power (less than 1 watt), it is also possible to heat directly on the sensor resistor by applying the vehicle's on-board electrical system voltage (approximately 14 volts) instead of the reference voltage of usually 5 volts.

The pressure sensor diaphragm 181 provides ideal conditions for this type of electrical heating as Al2O3 ceramic is a good conductor of heat and in addition and due to the principle the sensor diaphragm 181 is very thin. The sensor diaphragm 181 thus constitutes the optimum electrical insulation of the electrical heater from the heated aqueous solution of urea.

The electrical heating resistors 183 and the sensor resistor network 182 are connected via connecting pins and connecting lines 184 to an evaluation electronic system or heating actuation system which is preferably integrated in the metering control unit 9. The sensor element can also be connected to the metering control unit 9 by way of bonding wires or by direct soldering.

Figure 3:
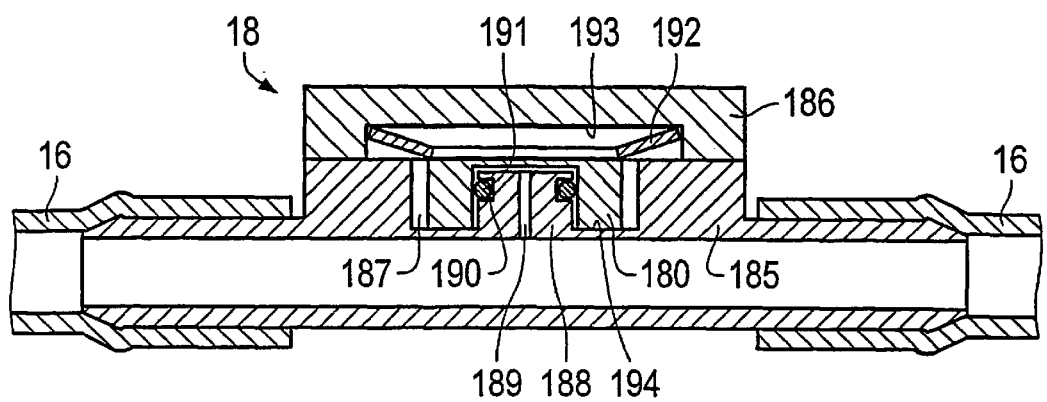
FIG. 3 shows a section through a pressure sensor according to a first exemplary embodiment.

A first exemplary embodiment of a pressure sensor 18 according to the invention is shown in FIG. 3, the pressure sensor element 180 being installed in a two-piece holding part 185, 186 and the latter being inserted in the feed line 16 which is embodied as an elastic hose. The holding part is embodied here as a T-element for the feed line 16, connecting elements (not designated in more detail) for the feed line 16 being integrally formed in a lower part 185 of the holding part. The lower part 185 also has a cylindrical cutout 187 in whose center a core 188, which is also cylindrical, is formed. The diameters of the cutout 187 and of the core 188 are matched to the geometry of the pot-shaped pressure sensor element 180 so that the latter can be inserted into the cutout 187. The cutout 187 is shaped in such a way that the pressure sensor element 180 is seated, as far as its shape permits, on the feed line 16 which is embodied as an elastic reducing agent hose. The core 188 has a central duct 189 with a significantly smaller cross section than the diameter of the feed line 16. Such an arrangement ensures that the dead volume of reducing agent solution upstream of the pressure sensor diaphragm 181 is as small as possible. In the simplest case, the duct 189 can be implemented by way of a drilled hole.

The core 188 has a radial groove 190 for holding a radial sealing element 191. An O-ring is preferably used as a radial sealing element 191. The radial sealing element 191 seals the pressure sensor element 180 to the core 188 so that reducing agent solution can act only on the pressure sensor diaphragm 181.

In order to protect the pressure sensor element 180, in particular the pressure sensor diaphragm 181, against mechanical or hydraulic overloading, the pressure sensor element 180 is not rigidly installed in the holding part 185, 186 but rather pressed against a support 193 by way of at least one spring element 192. The spring prestress is selected in such a way that in the entire acceptable working pressure range the pressure sensor element 180 is held in the position defined by the support 193. However, if, when the reducing agent solution freezes, the force on the pressure sensor diaphragm 180 exceeds the maximum value predefined by way of the prestress of the spring element, the pressure sensor element 180 can move out counter to the spring force and the pressure is limited by the resulting increase in volume in the space upstream of the pressure sensor diaphragm 181. As a result of the shaping of the holding part 185, 186 which is shown in the exemplary embodiment, the dead volume which as small as possible is achieved directly upstream of the pressure sensor diaphragm 181, and a sufficient increase in volume can thus be ensured by way of a small deflection of the pressure sensor element 180. The sealing of the pressure sensor element 180 by way of the radial sealing element 191 ensures that this deflection does not cause any leaks.

During slow freezing, pressure equalization can take place in the direction of the feed line 16 until the reducing agent solution in the duct 189 begins to freeze. If the pressure sensor element 180 is stored in a rigid fashion in the holding part 185, 186, the pressure at the pressure sensor element 180 would, at the latest, exceed the burst pressure at the phase transition from liquid to solid owing to the increase in volume of the reducing agent, and thus destroy the pressure sensor diaphragm 181.

Using the spring element 192 ensures that, despite the increase in volume of the reducing agent solution no unacceptable increase in pressure occurs in the dead volume, that is to say in the duct 189 and in the gap, between the core and pressure sensor diaphragm.

A disk spring can preferably be used as spring element 192, as shown in FIG. 3. However, other spring elements, for example arched or corrugated spring washers, helical springs, either with a circular cross section or rectangular cross section, conical springs, cushion springs, spiral springs, tubular springs, if appropriate with suitable adapters, can also be used. Moreover, it is also possible to use a plurality of spring elements. All that it is necessary to ensure is that the electrical contacts between the pressure sensor diaphragm 181 and an evaluation circuit of the pressure signal is not adversely affected by such a spring element arrangement. The evaluation circuit is preferably arranged in a cutout in the upper part 186 of the holding part (not shown).

The prestressing force of the spring element 192 is selected in such a way that the pressure sensor element 180 lifts off, counter to the spring force, from the supporting face 194 formed by the base of the cutout 187 in the lower part 185 of the holding part, before the burst pressure of the pressure sensor element 180 is reached. As a result, the increase in volume is achieved and the pressure is limited to a value which is determined by the ratio of spring force/area of pressure diaphragm.

The arrangement of a radial sealing element 191 ensures that, despite the movement of the pressure sensor element 180 in the holding part 185, 186, the seal is maintained and the enclosed volume of reducing agent solution can be minimized.

Instead of the radial sealing element 191, a seal which is integrally formed onto the pressure sensor element 181 itself or to the outside of the core 188 can be used to seal the pressure sensor element 181, or, as only a small deflection of the pressure sensor element 180 occurs (typically several $\frac{1}{10}$ mm), it can be sealed by way of elastic bonding.

Instead of a specific spring element 192 as an additional component of the pressure sensor 18, it is also possible to bring about the deflection of the pressure sensor element 180 by constructing housing walls of the holding part, in particular of the upper part 186, with a certain degree of flexibility.

Figure 4:
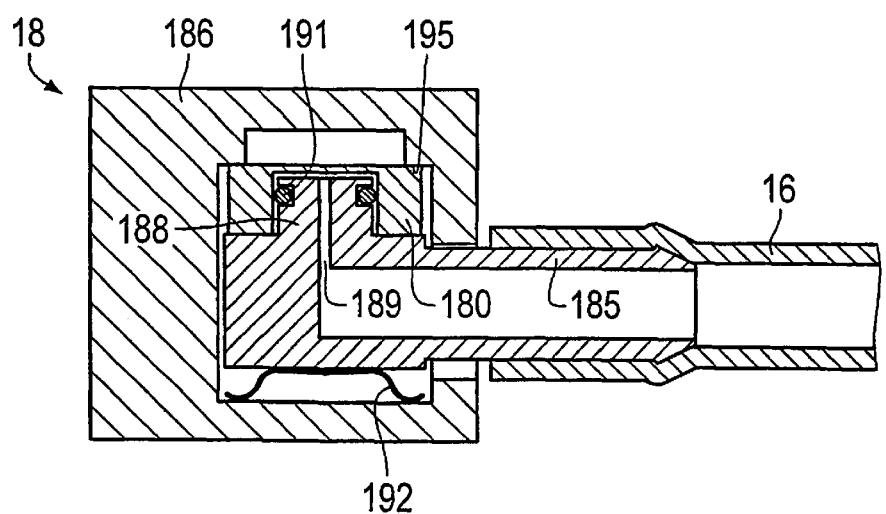
FIG. 4 shows a section through a pressure sensor according to a second exemplary embodiment.

FIG. 4 shows a further exemplary embodiment of providing movable support for the pressure sensor element 180 within a holding part, identical parts, or at least parts with an identical function, are provided with identical reference symbols.

In contrast to the embodiment described with reference to FIG. 3, the pressure sensor element 180 is pressed here against a rigid support face 195 on the holding part 186 by way of the spring element 192. The seal is provided in a way analogous to that already described by way of a radial sealing element 191 on the core 188 or by way of bonding. The lower part 185 of the holding part to which the feed line 16 is connected serves as a pressure feeder and is pressed against the pressure sensor element 180 by the spring element 192. Given overpressure owing to freezing of the reducing agent solution in the duct 189, in this embodiment it is not the pressure sensor element 180 which is deflected but rather the pressure feed, i.e. the lower part 185 of the holding part.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pressure sensor for sensing the pressure of a fluid, comprising:

a pressure sensor element having a pressure sensor diaphragm, a holding part for holding the pressure sensor element, and at least one spring element being used to hold the pressure sensor element within a working pressure range of the pressure sensor element being in a defined solution in the holding part, said at least one spring element limiting the pressure on the pressure sensor diaphragm when a working pressure range of the pressure sensor element is exceeded, whereby the pressure sensor diaphragm may be wetted directly by the fluid.

2. The device as claimed in claim 1, wherein when the working pressure range is exceeded, the pressure sensor element is deflected counter to the spring force of the spring element in the holding part so that the pressure on the pressure sensor diaphragm is limited there by volume increase in the space in front of the pressure sensor diaphragm.

3. The device as claimed in claim 1, wherein the at least one spring element is constructed as one of a disk spring, arched or corrugated washer, helical spring, conical spring, cushioning spring, spiral spring and a tubular spring.

4. The device as claimed in claim 3, wherein the spring element is arranged between a surface of the pressure sensor element which bears the pressure sensor diaphragm, and a support which faces the pressure sensor diaphragm, in the holding part.

5. The device as claimed in claim 1, wherein the solution is a solution of reducing agent for exhaust gas post-treatment in an internal combustion engine.

6. The device as claimed in claim 2, wherein the at least one spring element is constructed as one of a disk spring, arched or corrugated washer, helical spring, conical spring, cushioning spring, spiral spring and a tubular spring.

7. The device as claimed in claim 6, wherein the spring element is arranged between a surface of the pressure sensor element which bears the pressure sensor diaphragm, and a support which faces the pressure sensor diaphragm, in the holding part.

* * * * *